(12) United States Patent
Lloyd

(10) Patent No.: US 7,942,368 B2
(45) Date of Patent: May 17, 2011

(54) COMPOSITE AIRCRAFT COMPONENT

(75) Inventor: James Lloyd, Bristol (GB)

(73) Assignee: Airbus Operations Limited, Bristol (GB)

( * ) Notice: Subject to any disclaimer, the term of this patent is extended or adjusted under 35 U.S.C. 154(b) by 479 days.

(21) Appl. No.: 11/762,362

(22) Filed: Jun. 13, 2007

(65) Prior Publication Data
US 2008/0308669 A1   Dec. 18, 2008

(30) Foreign Application Priority Data
Jun. 14, 2006 (GB) .................................. 0611802.0

(51) Int. Cl.
*B64C 1/00* (2006.01)
*B64C 3/00* (2006.01)

(52) U.S. Cl. .................. 244/123.1; 244/129.1; 244/133; 416/224; 416/229 R; 416/230

(58) Field of Classification Search ................ 428/36.9, 428/99, 192; 248/345.1; 52/716.8, 717.03, 52/717.05; 244/129.1–133, 123.1; 108/90, 108/27; 416/224, 229, 230, 230 R
See application file for complete search history.

(56) References Cited

U.S. PATENT DOCUMENTS

| | | | | |
|---|---|---|---|---|
| 3,897,967 A | * | 8/1975 | Barenyi | 293/120 |
| 4,106,739 A | * | 8/1978 | Gasser | 248/345.1 |
| 4,350,728 A | * | 9/1982 | Huang et al. | 428/105 |
| 4,667,906 A | | 5/1987 | Suarez | |
| 4,895,491 A | | 1/1990 | Cross | |
| 5,165,859 A | | 11/1992 | Monroe | |
| 6,341,747 B1 | * | 1/2002 | Schmidt et al. | 244/123.1 |
| 6,544,366 B2 | | 4/2003 | Hamilton et al. | |

FOREIGN PATENT DOCUMENTS

| | | |
|---|---|---|
| EP | 0496550 A1 * | 7/1992 |
| WO | 2004098993 A | 11/2004 |

* cited by examiner

*Primary Examiner* — Alexander Thomas
(74) *Attorney, Agent, or Firm* — Lowe, Hauptman, Ham & Berner, LLP

(57) ABSTRACT

This invention relates to improving the tolerance of composite laminate structures to damage and/or delamination, resulting in weakening of the structure and/or to reducing the possibility of such damage and/or delamination. In particular, but not exclusively the invention relates to protecting the end surfaces of composite laminate structures present on aircraft from impact damage. The invention provides an aircraft component comprising a composite laminate structure, the composite laminate structure including an end surface at which a multiplicity of the layers of the laminate structure terminate, wherein the aircraft component further comprises a deformable strip mounted to protect the end surface of the composite laminate structure from direct impacts.

10 Claims, 4 Drawing Sheets

COMPOSITE AIRCRAFT COMPONENT

RELATED APPLICATIONS

The present application is based on, and claims priority from, British Application Number 0611802.0, filed Jun. 14, 2006.

BACKGROUND OF THE INVENTION

This invention relates to improving the tolerance of composite laminate structures to damage and/or delamination, resulting in weakening of the structure and/or to reducing the possibility of such damage and/or delamination. In particular, but not exclusively, the invention relates to protecting an end surface of a composite laminate structure of an aircraft component from impact damage.

Many aircraft components are made from composite laminate materials. For example, a stringer in an aircraft wing, stiffeners and spar structures, may all be in the form of composite laminate structures. While the structures may be strong when loaded in the way in which they have been designed to be loaded, they may be vulnerable to impact damage, which may result in delamination occurring. Delamination may result in the structure weakening and eventually failing. Particularly vulnerable are the planar end faces of composite laminate structures where an impact occurs, particularly if the impact is end-on (i.e. when the impact is in a direction perpendicular to the end face and parallel to the plane of the laminates that make up the structure). It will be understood that the planar end face is the surface at which the layers of the composite laminate structure terminate and that the normal axis of the end face is typically parallel to the direction in which the composite laminate structure extends from the end face. If an impact has a significant component of force in the end-on direction the impact may be capable of damaging the bonding between the laminate's layers comprising the composite laminate structure and causing, or adding to the effect of, delamination. Such impacts may be as a result of workmen dropping tools whilst working on the structure of an aircraft, during maintenance for example when the end surfaces of the composite laminate structures are exposed in a way they are usually not. A further way in which the composite laminate structures may be damaged is as a result of wear over time, such wear for example resulting from workmen sitting, or standing, on the structure or contacting the structure directly or by means of tools, or other equipment. It is for example common for a workman to rest tools or toolboxes on the end surface of such structures while working on the aircraft. The planar end face of a composite laminate structure is typically exposed, at least during maintenance, to direct wear and direct impacts as described above.

When designing an aircraft, factors that affect the strength and other mechanical properties of composite laminate structures of the aircraft, such as those factors described above, are taken into account. Thus, factors such as those described above typically mean that the composite laminate structures need to be provided with extra strength, resulting in an increase in size and weight, both of which are undesirable in aircraft design.

DESCRIPTION OF THE RELATED ART

U.S. Pat. No. 6,544,366 (Hamilton et al.) discloses a prior art composite member including a flat end surface. U.S. Pat. No. 6,544,366 is primarily concerned with improving the mechanical properties of the composite member by reinforcing the member in the z-axis direction (i.e. through-the-layer strength). In particular, U.S. Pat. No. 6,544,366 proposes that laminate material be wrapped around the end surfaces of the laminate structure in order to reinforce the member where interlaminar tensile stresses are greatest. U.S. Pat. No. 6,544,366 also suggests the application of (optional) end surface protectors to the end surfaces of the composite member, such end protectors also providing extra z-axis reinforcement. The end surface protectors provide only limited protection to the composite member insofar as reducing the force of an impact is concerned, such limited protection arising from the formation of a barrier layer over the end surface.

SUMMARY OF THE INVENTION

The invention provides an aircraft component comprising a composite laminate structure, the composite laminate structure including an end surface at which a multiplicity of the layers of the laminate structure terminate, wherein the aircraft component further comprises a deformable strip mounted to protect the end surface of the composite laminate structure from direct impacts.

The deformable strip utilised in the present invention is able to deform on impact thereby absorbing and/or redistributing (for example spreading) the force of the impact. The amount of damage that an impact will cause to the composite laminate structure may thereby be reduced. Consequently, there may be less need for z-axis reinforcement. Also the component may be designed, in view of the greater protection against damage afforded by the strip, to have structural properties (for example, a higher strain to failure) such that the component is lighter.

The deformable strip may be a resiliently deformable strip. Due to the material characteristics of the resiliently deformable strip, an impact received by the strip may cause the strip to deform on impact and then substantially reform its original shape. This deformation results in some of the kinetic energy of the projectile that has caused the impact being converted into potential energy in the resiliently deformable strip. After the maximum impact force has been achieved the potential energy stored within the resiliently deformable strip is converted back into kinetic energy within the projectile and there will be a rebound after the initial impact. As less of the kinetic energy of the projectile has been imparted to the composite laminate structure, the amount of damage that an impact will cause is reduced.

The composite laminate structure is a three dimensional object. It has a thickness, the thickness determined by the thickness and number of layers of the composite laminate structure. The composite laminate structure preferably includes a portion having a thickness greater than 5 mm, and preferably greater than 7.5 mm. The composite laminate structure also has a width and length, both being parallel to the laminate layers of the structure, which may be substantially planar or may be curved. The end surface extends in a direction parallel to the layers of the composite laminate structure. The term cross-section is used herein in relation to the invention, unless the context suggests otherwise, to mean the cross-section taken along a plane having a normal parallel to the direction in which the end surface extends in the region of the cross-section. The plane of the cross-section is thus transverse to the plane of the layers of the laminate structure.

The deformable strip may include at least one hollow section. This has the benefit of further increasing the deformability of the deformable strip. Furthermore, the weight of the deformable strip may be reduced in this way. The hollow section may have a substantially circular cross-section. The hollow section may be in the form of a recess in the deformable strip, such as a large groove running along the length of the deformable strip. The outer surface of the deformable strip may be substantially the same shape as the cross-section of the hollow section of the strip. In the example of a hollow having a circular cross-section, the outer surface of the deformable strip that receives an impact may have a substantially semi-circular profile in cross-section. There may be a plurality of hollow sections in the deformable strip.

The deformable strip may define a deflecting surface, which also acts to protect the end surface of the composite laminate structure from direct impacts. The deflecting surface may be so shaped and arranged that in the event of an impact (in particular impacts in an end-on direction or impacts in a direction in which a significant component of the impact force is in an end-on direction) it acts to deflect the impact. Thus the deflection of the impact may reduce the impact force experienced and/or the damage sustained by the end surface of the composite laminate structure. An aircraft component comprising a composite laminate structure and a deflecting surface mounted to protect the end surface of the composite laminate structure from direct impacts is described in UK patent application entitled "Improved Aircraft Component", with agent's reference 12036GB, having the same filing date as the present application. The contents of that application are fully incorporated herein by reference. The aircraft component of the present invention may incorporate any of the features disclosed in that patent application. In particular, the claims of the present application may be amended to include the feature of the deformable strip of the aircraft component defining a deflecting surface, wherein the deflecting surface is as described or claimed in the above-mentioned related patent application. For example, the deformable strip of the present invention may have a shape in accordance with the shape of the "inert strip" according to any aspect of the aircraft component as described or claimed in that patent application. The deformable strip may for example define an outer surface that is convex in cross-section.

The provision of a convex outer surface may mean that the deformable strip is able to deflect at least partially an end-on impact. A deformable strip with a convex outer surface may be applied to a composite laminate structure including a flat end surface with the dual benefit of absorbing at least some of a direct impact and also deflecting said impact.

The end surface may be substantially straight in cross-section. The end surface may for example be shaped such that in cross-section the end surface is perpendicular to the direction in which the layers of the composite laminate structure extend. The cross-section of the outer surface of the deformable strip may have a cross-section that has a profile that is significantly different from the profile defined by the end surface when viewed in cross-section. For example, the outer surface of the deformable strip may be convex in cross-section compared to a flat end surface.

The deformable strip may comprise an elastomer. The elastomer may be a MVQ (Silicon) elastomer.

The invention also provides a method of manufacturing an aircraft component as described herein. For example, the invention provides a method of manufacturing an aircraft component, comprising the steps of:

providing a composite laminate structure including an end surface at which a multiplicity of the layers of the laminate structure terminate, and mounting a deformable strip to the composite laminate structure for protecting the end surface from direct impacts.

As has been described above, the deformable strip protects the end surface from direct impacts by at least partially absorbing such impacts. The step of mounting the deformable strip to the end surface may comprise adhesively bonding the deformable strip to the end surface. The composite laminate structure may be treated to improve the adhesive bonding between the composite laminate structure and the deformable strip. The treatment may be in the form of being painted or having a gel coat.

The deformable strip may be mechanically attached to the composite laminate structure. A method of mechanically attaching a strip to a composite laminate structure is described in UK patent application entitled "Improved Aircraft Component", with agent's reference 12036GB, having the same filing date as the present application (also mentioned above). The mechanical attachment of the deformable strip to the composite laminate structure and the method for achieving that mechanical attachment may incorporate any of the features disclosed in that patent application. In particular, the claims of the present application may be amended to include the feature of the deformable strip having formations for engaging with corresponding formations present on the composite laminate structure, the formations present on the composite laminate structure possibly being defined by material, for example adhesive, resin or the like, adhesively bonded to the composite laminate structure.

The invention also provides an aircraft including an aircraft component according to any aspect of the invention described herein. The invention further provides an aircraft wing including an aircraft component according to any aspect of the invention described herein.

It will of course be appreciated that features of aspects of the invention relating to the aircraft component of the invention may be incorporated into a method of manufacture according to the present invention and vice versa. Thus, the aircraft component of the present invention may possess features that would result from the performance of a method according to any aspect of the invention. Also, a method according to the present invention may be performed in such a way as to result in the manufacture of a component possessing features of an aircraft component according to any aspect of the invention.

BRIEF DESCRIPTION OF THE DRAWINGS

An embodiment of the invention will now be described, by way of example only, with reference to the accompanying drawings of which.

DETAILED DESCRIPTION OF THE DRAWINGS

Figure 1:
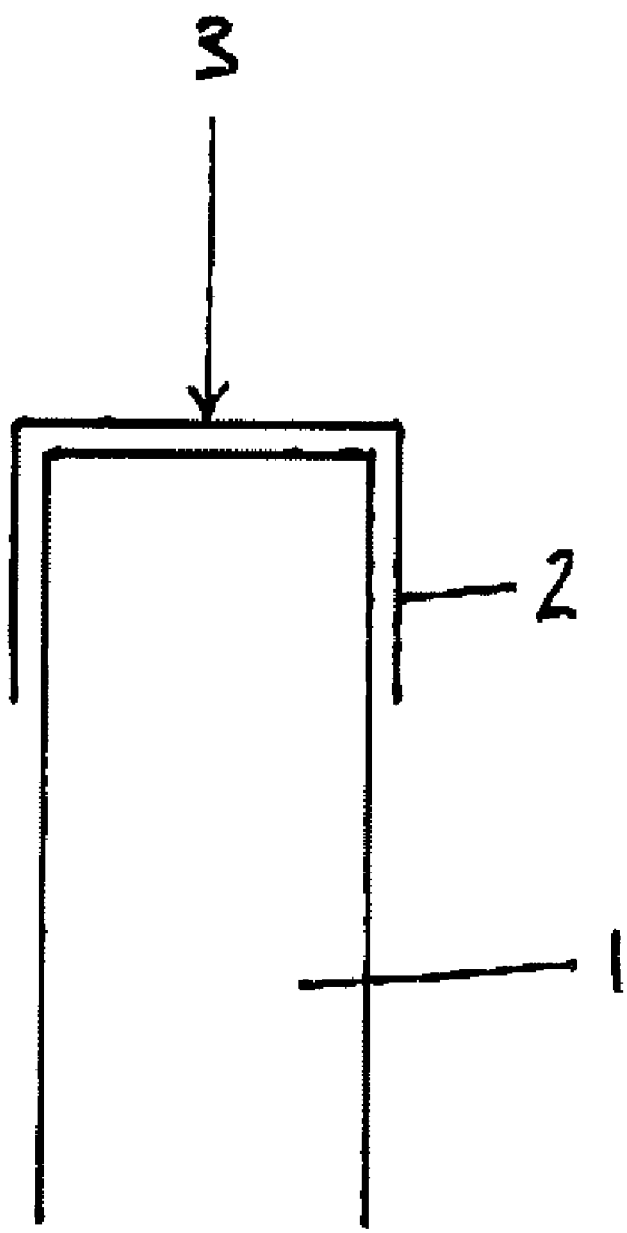
FIG. 1 is a cross-sectional view of the prior art with the effect of an end-on impact on end surface reinforcement indicated.

FIG. 1 shows an end-on impact 3 to the end surface of a composite member 1 having an end surface protector 2 in accordance with U.S. Pat. No. 6,544,366. The end surface protector 2 receives the impact, but does nothing or very little to absorb the force of the impacts transferring most of the impact to the end surface of the composite member.

Figure 2:
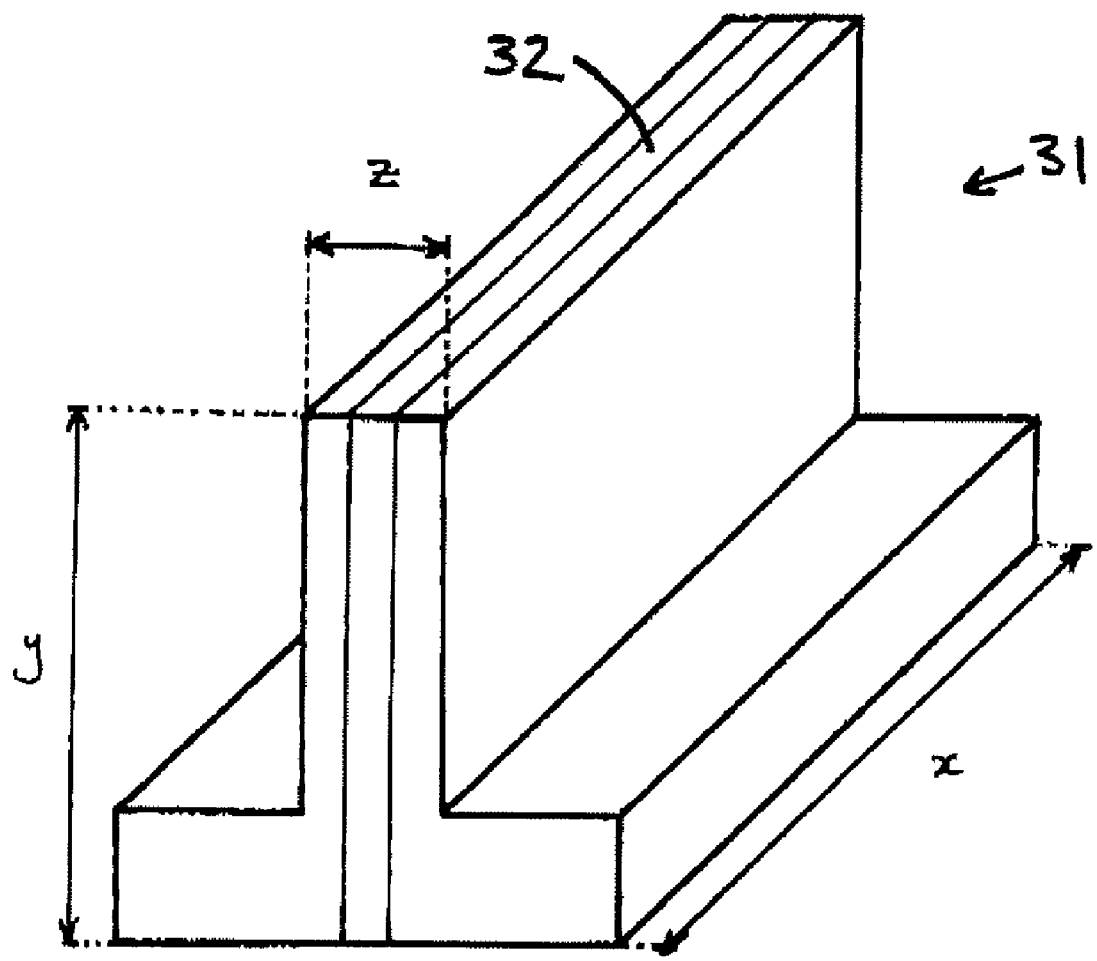
FIG. 2 is a three dimensional view of an aircraft stringer.

The embodiment of the present invention is a strip used to protect the free-end of a stringer. FIG. 2 is a schematic representation of such an aircraft stringer 31 with various dimensions indicated. The length of the stringer is represented by the letter x, the height of the stringer is represented by the letter y and the thickness of the stringer is represented by the letter z. The stringer is made up of a number of plies of laminate materials that have been laid on top of each other and then cured in an autoclave and it can be seen from the diagram the plane in which the laminate materials have been laid, i.e. perpendicular to the thickness z and parallel to the length x and height y (i.e. the length of the plies runs parallel to the length x, and the width of the plies runs parallel to the height y). The stringer includes an exposed end surface 32. The direction in which the length x of the stringer 31 is measured as 0 degrees and the direction in which the height y of the stringer is measured as 90 degrees. The lay-up of the stringer is represented by a notation representing the percentage of the fibres in the lay up that are oriented in the directions 0 degrees/ ±45 degrees/90 degrees. A typical stringer lay-up is 60/30/10. Therefore, 60 percent of the fibres are oriented in the 0 degree direction, 30 percent in the ±45 degree direction and 10 percent in the 90 degree direction. The lay-up of stringer utilised in this embodiment is 70/20/10.

It is necessary in aircraft manufacture to design stringers to a certain design allowable strain. A typical allowable strain of a composite laminate stringer would, when not accounting for impact damage, be about 3.7 kμE. However, the exposed end surface 32 is vulnerable to impact, especially impacts in a direction parallel to the height of the stringer. This can bring the allowable strain down to approximately 3 kμE. Aluminium then becomes a better choice with regard to the ratio of weight to allowable strain.

Figure 3:
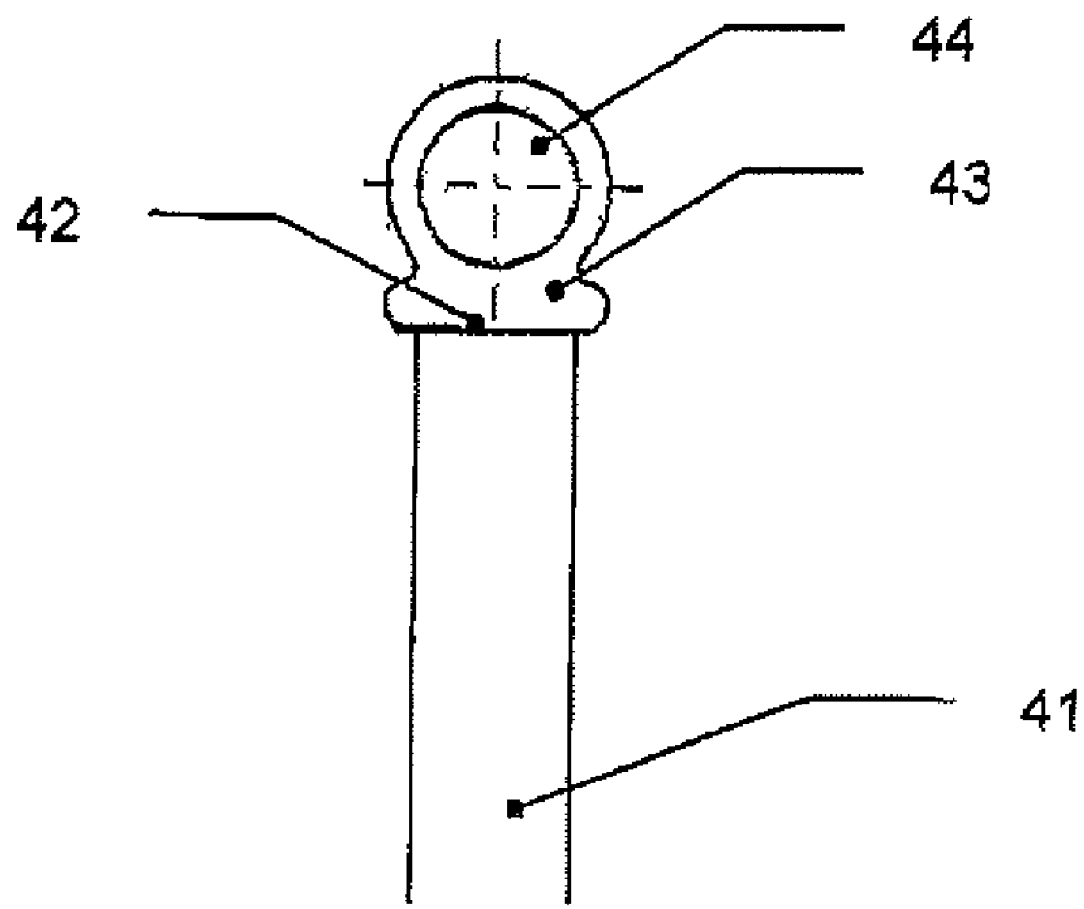
FIG. 3 is a cross-sectional view of the embodiment of the invention.

FIG. 3 shows an embodiment of the invention, in which the composite laminate structure is an aircraft stringer 41, of the same basic construction as described relating to FIG. 2, but with only the top section of the stringer shown in cross-section. The stringer 41 has a thickness of 10 mm and is made up of 54 plies, each ply 0.183 mm thick. The height of the stringer 41 is 70 mm and the length is 1000 mm. An MVQ elastomer strip 43, including a hollow central section 44 with an approximately circular cross-section when not under any external impact forces, is mounted to the edge 42 by an adhesive. The adhesive is applied to the end surface of the stringer 42, the elastomer strip 43 mounted on the end surface 42 and the adhesive cured such that the elastomer strip 42 is adhesively bonded to the composite laminate structure 41.

Figure 4:
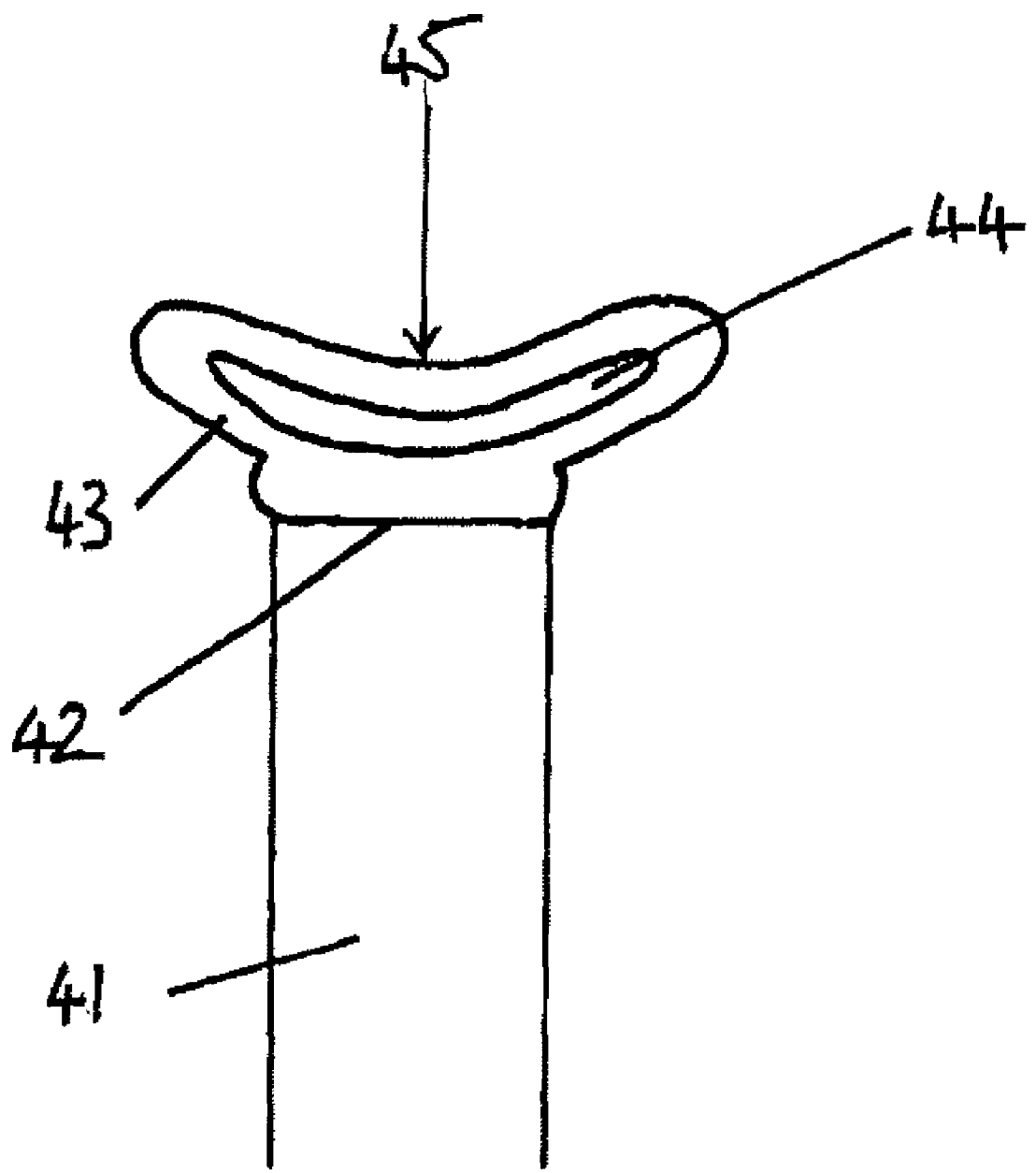
FIG. 4 is a cross-sectional view of an embodiment of the invention with the effect of an end-on impacts on the resiliently deformable strip indicated.

FIG. 4 shows the strip 43 during an end-on impact 45, shortly after an object has come into contact with the strip. The elastomeric strip is resiliently deformable and, as can be seen in FIG. 4, has been deformed, resulting in the some of the kinetic energy of the impact being absorbed by the resiliently deformable strip 43 and the end surface of the composite laminate structure 42 experiencing less of the force of the impact 45. This can be contrasted with the limited protection that is afforded by the arrangement of U.S. Pat. No. 6,544,366 shown in FIG. 1. The design allowable strain of the stringer 41 is greater than 3 kμE and thus the composite stringer can be significantly lighter than an unprotected stringer.

Whilst the present invention has been described and illustrated with reference to particular embodiments, it will be appreciated by those of ordinary skill in the art that the invention lends itself to many different variations not specifically illustrated herein.

For example, the invention is applicable to various aircraft component including stiffeners and spar structures. Furthermore, different elastomers may be used to make the deformable strip. The strip need not be resilient and may for example be arranged to deform non-elastically. Such deformation may still provide protection against impact damage to the aircraft component, because the strip may effectively act as a protective "crumple zone".

The size, shape and number of the hollows in the deformable strip may also vary. The strip may be mechanically attached to the composite structure.

Whilst the stringer of the above embodiment has a thickness of 10 mm, the embodiment can readily be adapted for use in relation to a wide range of thicknesses of composite laminate structures, including the range of 2 mm to 35 mm typical for aircraft structural components. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft component, comprising:
   a composition laminate structure, the composite laminate structure including an end surface at which a multiplicity of the layers of the laminate structure terminate; and
   a resiliently deformable strip mounted to protect the end surface of the composite laminate structure from direct impacts, wherein the resiliently deformable strip includes at least one hollow section.

2. An aircraft component as claimed in claim 1, wherein the hollow section has a substantially circular cross-section.

3. An aircraft component as claimed in claim 1, wherein the outer surface of the resiliently deformable strip is substantially the same shape as the cross-section of the hollow section of the strip.

4. An aircraft component as claimed in claim 1, wherein the resiliently deformable strip comprises an elastomer.

5. An aircraft component as claimed in claim 1, wherein the composition laminate structure is a stringer.

6. An aircraft component as claimed in claim 1, wherein the resiliently deformable strip is adhesively bonded to the end surface of the composition laminate structure.

7. An aircraft component as claimed in claim 1, wherein the resiliently deformable strip is an MVQ silicone elastomer.

8. An aircraft component as claimed in claim 1, wherein the resiliently deformable strip includes
   a base section directly bonded to the end surface of the composition laminate structure; and
   said at least one hollow section on said base section for absorbing direct impacts.

9. In an aircraft, an aircraft component comprising:
   a composite laminate structure, the composite laminate structure including an end surface at which a multiplicity of the layers of the laminate structure terminate, and
   a resiliently deformable strip mounted to protect the end surface of the composite laminate structure from direct impacts, wherein the resiliently deformable strip includes at least one hollow section.

10. An aircraft wing comprising an aircraft component, the aircraft component comprising:
   a composite laminate structure, the composite laminate structure including an end surface at which a multiplicity of the layers of the laminate structure terminate, and
   a resiliently deformable strip mounted to protect the end surface of the composite laminate structure from direct impacts, wherein the resiliently deformable strip includes at least one hollow section.

* * * * *